United States Patent [19]
Calfee et al.
[11] 3,715,474
[45] Feb. 6, 1973

[54] COLOR VIDEO RECORDING AND PLAYBACK SYSTEM

[75] Inventors: Richard W. Calfee, San Jose; Emil Hopner, Los Gatos, both of Calif.
[73] Assignee: International Business Machines Corporation, Armonk, N.Y.

[22] Filed: Dec. 26, 1967
[21] Appl. No.: 693,326

[52] U.S. Cl. ....................178/5.4 CD, 178/6, 332/17
[51] Int. Cl. ....................H04n 9/02
[58] Field of Search .........178/5.4 CD, 6; 325/41, 61; 332/17, 22, 41, 42

[56] References Cited

UNITED STATES PATENTS

| | | | |
|---|---|---|---|
| 2,103,847 | 12/1937 | Hansell | 332/17 |
| 2,290,823 | 7/1942 | Haugh | 178/6 |
| 2,342,943 | 2/1944 | Kell | 332/17 |
| 2,578,714 | 12/1951 | Martin | 332/17 |
| 2,945,212 | 7/1960 | Shekels | 332/17 |
| 2,967,234 | 1/1961 | Piazza | 332/17 |
| 3,075,041 | 1/1963 | Roizen | 178/5.4 CR |
| 3,095,472 | 6/1963 | Dolby | 178/5.4 CR |
| 3,267,207 | 8/1966 | Okazaki | 178/5.4 CR |

*Primary Examiner*—Robert L Griffin
*Assistant Examiner*—Joseph A. Orsino, Jr.
*Attorney*—Hanifin and Jancin and Nathan N. Kallman

[57] ABSTRACT

A color video recording and playback system employs a continuous sinusoidal subharmonic of the color subcarrier signal, which is used to amplitude modulate a frequency modulated video signal during the record mode, and is retrieved during playback for synchronization and phase correction of the color signal.

4 Claims, 9 Drawing Figures

*INVENTORS.*
RICHARD W. CALFEE
EMIL HOPNER

BY Nathan N. Kallman

ATTORNEY

COLOR VIDEO RECORDING AND PLAYBACK SYSTEM

BACKGROUND OF THE INVENTION

1. Field of the Invention

This invention relates to a novel and improved method and means for recording and playback of color video signals.

2. Description of Prior Art

In conventional color television recorders that operate in accordance with the standards prescribed by NTSC (National Television Standards Committee), a 3.58 mHz color subcarrier or burst signal is tacked onto the back porch of each horizontal line of video information. This burst signal, which is displaced in frequency from the remainder of the chrominance information, is used as a phase reference when demodulating the chrominance components during the playback process. In order to reproduce the recorded color signal faithfully, it is necessary to maintain a high degree of time base stability, since as small as a 5 percent phase shift affects the saturation and hue of the reproduced color signal. Therefore, it is necessary to employ voltage variable delay lines and associated controls, or the like, to provide such stability and to minimize time base jitter. However, such additional circuitry is complex and costly.

In some special purpose systems, a continuous reference or pilot signal is utilized in lieu of a burst, to obtain color synchronization and to reduce jitter effects upon playback. In such known systems, which are particularly applicable to closed circuit television but not to the standard NTSC system, the pilot is linearly added to the video signal. By necessity, the linearly added pilot is restricted to a narrow amplitude range, or else an interfering signal would be generated between the pilot and the composite video signal. In view of sensitivity of such systems to amplitude variations, the color subcarrier may be adversely affected upon its separation from the video signal during the reproduce mode, resulting in color distortion, among other things.

BRIEF SUMMARY OF THE INVENTION

An object of this invention is to provide a simple and inexpensive color synchronization means in a color video processing system.

Another object of this invention is to provide an improved color signal recording system that is compatible with NTSC standards.

According to this invention, a color video signal recording system incorporates an amplitude modulator in a record channel for amplitude modulation of a frequency modulated composite video signal that is to be recorded. The amplitude modulating signal is developed as a continuous sinusoidal waveform representing a subharmonic frequency of the standard color burst signal. During playback, this subharmonic is retrieved and utilized for continuous color subcarrier synchronization. By means of this arrangement, color synchronization is maintained continuously and color saturation and hue jitter is minimized, in a system that may be operated in accordance with NTSC standards.

BRIEF DESCRIPTION OF THE DRAWINGS

The foregoing and other objects, features and advantages of the invention will be apparent from the following more particular description of a preferred embodiment of the invention, as illustrated in the accompanying drawings.

In the drawings.

DESCRIPTION OF THE PREFERRED EMBODIMENT

Figure 1:
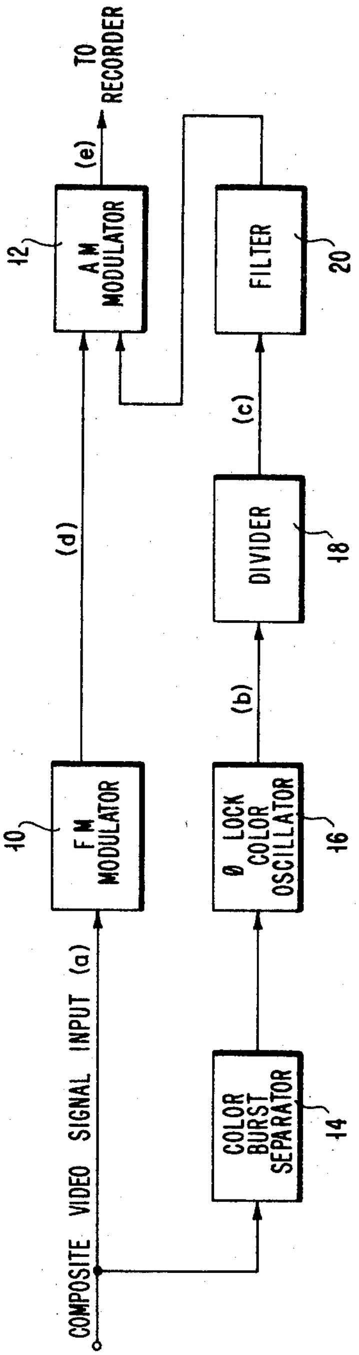
FIG. 1 is a block diagram of a color signal recording system, in accordance with this invention.

With reference to FIG. 1, a color signal recording apparatus includes a frequency modulation (FM) circuit 10 that receives a composite color video signal 11 (FIG. 3*a*), formed in accordance with prescribed NTSC standards. The video signal 11 contains color signal components as well as monochrome or luminance information. The composite signal 11 includes synchronizing components, i.e., the horizontal and vertical sync pulses, and in addition carries a color burst reference 13 (FIG. 3*b*) of 3.58 mHz frequency on the back porch of the horizontal sync pulse. The composite signal is applied to the modulator 10, which supplies a carrier frequency, such as 5.5 mHz, for modulation with the video signal. The frequency modulated signal 15 (FIG. 3*d*) is then applied to an amplitude modulation (AM) circuit 12.

Figure 3:
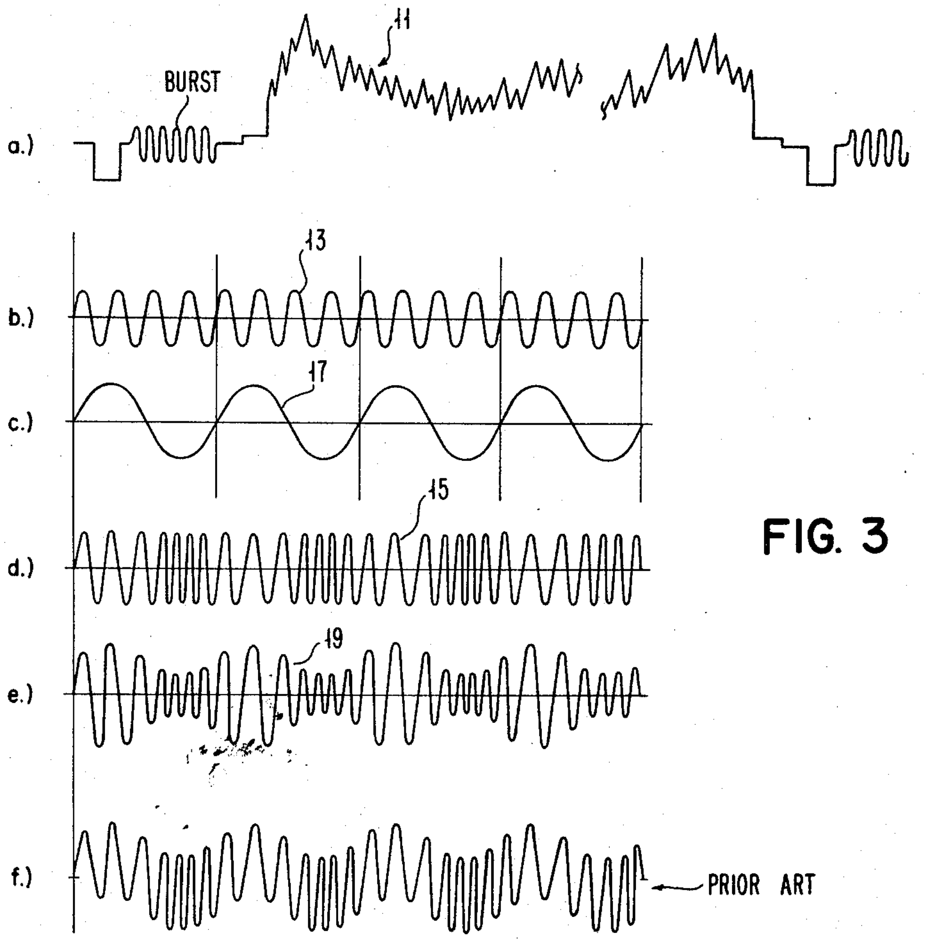
FIGS. 3*a–f* are exemplary waveforms to aid in the explanation of the invention.

At the same time, the composite signal 11 is directed to a color burst separator 14, wherein the color subcarrier 13 is filtered and fed to a phase locked color oscillator 16, which generates a continuous sinusoidal color reference signal at the same frequency and phase as the color burst. This 3.58 mHz continuous signal is applied to a frequency divider 18, that produces a subharmonic frequency signal 17 (FIG. 3*c*) of the reference subcarrier, such as 895 kHz for example. The subharmonic subcarrier 17 is then channeled through a bandpass filter 20 to the modulator 12 for amplitude modulation of the FM video signal 15, to produce a signal 19 such as depicted in FIG. 3*e*. The amplitude modulated FM signal 19 is substantially free of spurious amplitude variations, which are experienced with prior art systems (see waveform FIG. 3*f*). The amplitude modulated FM signal 19 is channeled through amplifier stages, in a manner well known in the art, to recording head means for registration on a storage medium, such as a magnetic tape.

Figure 2:
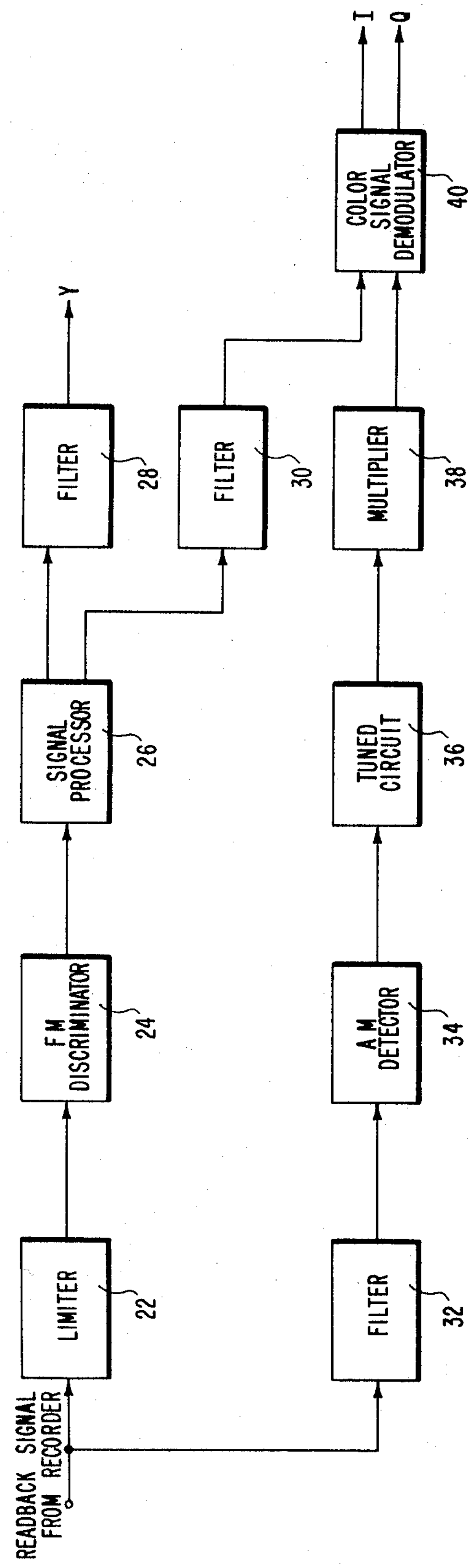
FIG. 2 is a block diagram of a color signal playback system that cooperates with the recording apparatus of FIG. 1.

With reference to FIG. 2, the recorded signal is read out during the playback mode by reproduce head means and applied to a limiter 22. In the limiter, undesirable amplitude modulation and noise are substantially eliminated, and the FM signal is recovered. The limiter output is detected by an FM discriminator 24, and the demodulated signal is applied to a signal processor and amplifier 26. The output of the processor 26 is channeled through filters 28 and 30, respectively, the filter 28 serving to separate the luminance or Y component from the video signal, whereas the filter 30 recovers the chrominance portion of the composite signal.

Concomitantly, the readout signal is channeled through a bandpass filter 32 to an AM diode detector 34, which retrieves the subharmonic subcarrier 17 used for amplitude modulation during recording. This subharmonic signal 17 is filtered through a high Q tuning circuit 36, and the filtered signal is applied to a frequency multiplier 38 to produce the 3.58 mHz reference subcarrier as a continuous sinusoidal waveform.

It should be noted that the reference carrier waveform that was recorded in conjunction with the composite video signal as an amplitude modulation signal is subject to the same frequency and phase variations that are experienced by the video information signal during record and playback. This 3.58 mHz continuous wave subcarrier is referenced to the recovered color signal portion received from the filter 30 in a demodulator 40, whereby the I and Q signal components are recovered in proper phase relationship. These I and Q signals are then utilized in combination with the reproduced Y signal to form a composite color signal that is suitable for transmission and display.

Figure 4:
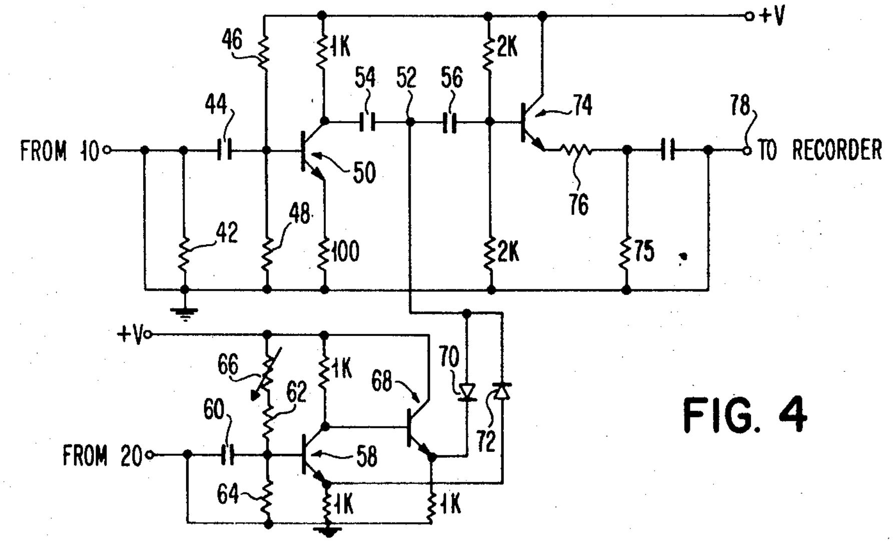
FIG. 4 is a schematic circuit diagram illustrating an example of an amplitude modulation circuit that may be utilized with this invention.

The schematic circuit of FIG. 4 illustrates an example of an amplitude modulation circuit, which may be used with the recording apparatus of FIG. 1. In this circuit, the FM signal 15 is supplied from the FM modulator 10 across a grounded resistance 42 and capacitance 44, through bias resistors 46 and 48 to the base of NPN drive transistor 50. The output from the collector of transistor 50 is clamped at a junction 52 between serially connected capacitors 54 and 56.

Simultaneously, the signal from the filter 20 is applied to the base of transistor 58 through a capacitor 60 and bias resistors 62 and 64, these resistors being in series with a variable resistor or potentiometer 66 that provides DC balance. The output of transistor 58 is taken from its collector and applied to an emitter follower transistor 68. A push-pull signal output is obtained from the emitters of transistors 58 and 68 and is directed through limiting diodes 70 and 72 for application to the clamped junction 52. This push-pull signal serves to amplitude modulate the FM signal, and the amplitude modulated FM signal is then fed to a driver stage including a transistor 74, having its emitter coupled to a low impedance resistor 76. The amplitude modulated FM signal is then channeled to a recording apparatus that is coupled to an output terminal 78.

In a successful embodiment of this invention, the following values were used for the components illustrated in the amplitude modulator of FIG. 4, as follows:

| | |
|---|---|
| Resistor 42 – 74 ohms | Resistor 62 – 1,000 ohms |
| Capacitor 44 – 0.1$\mu$Farad | Resistor 64 – 2,000 ohms |
| Resistor 46 – 3,000 ohms | Resistor 66 – 5,000 ohms |
| Resistor 48 – 300 ohms | Diodes 70 and 72 – 1N4,009 |
| Capacitors 54 and 56 – .01$\mu$Farad | Resistor 76 – 300 ohms |
| Capacitor 60 – .1$\mu$Farad | Transistors 50, 58, 68, 74 – 2N708 |

Those components of the circuit not bearing a reference numeral, and therefore not listed in the tabulation above, are labeled in the Figure with preferred values.

By virtue of the system disclosed herein, a composite color video signal containing both chrominance and luminance information may be recorded through a single channel on a single track of a storage medium. Also, linear operation may be realized without resorting to bias recording. Furthermore, the FM type transmission is not sensitive to amplitude variations, and spurious amplitude modulation and noise are minimized.

While the invention has been particularly shown and described with reference to a preferred embodiment thereof, it will be understood by those skilled in the art that the foregoing and other changes in form and details may be made therein without department from the spirit and scope of the invention.

What is claimed is:

1. A color video recording system compatible with NTSC standards, comprising:
   - means for frequency modulating a composite color video signal;
   - means for providing a color subcarrier having a reference frequency and a continuous sinusoidal waveform;
   - a frequency divider coupled to said color subcarrier providing means for producing a subharmonic frequency of said color subcarrier;
   - an amplitude modulation circuit means coupled to the outputs of the frequency modulating means and said frequency divider, so that the subharmonic subcarrier is modulated with the frequency modulated video signal, thereby to provide an amplitude modulated FM signal substantially free of spurious amplitude variations;
   - and head means for recording said amplitude modulated FM video signal on a storage medium.

2. In combination with the color video recording system of claim 1, a system for producing a read out signal from said storage medium, said system including
   - head means for reading out a recorded signal;
   - a first signal channel having limiting means coupled to said head means for removing amplitude modulation from said read out signal, and
   - means coupled to said limiting means for detecting the frequency modulation of said color video signal;
   - a second signal channel including an amplitude modulation detection means for detecting the color subcarrier signal; and
   - means coupled to said first and second channels for demodulating the color video signal in synchronization with the detected subcarrier signal.

3. The combination of a color video recording system and color video reproducing system of claim 2, wherein the second signal channel further includes a tuned circuit coupled to the output of the amplitude modulation detection means, and a
   - means connected between said tuned circuit and said demodulating means for multiplying the detected subharmonic color subcarrier to produce the frequency of the color reference subcarrier.

4. The combination of claim 3 wherein the amplitude modulated FM video signal contains the chrominance and luminance components of the composite color video signal necessary for color television transmission and reception, and such composite signal is processed through a single channel for recording on a single track of said storage medium.

* * * * *